Figure 1:
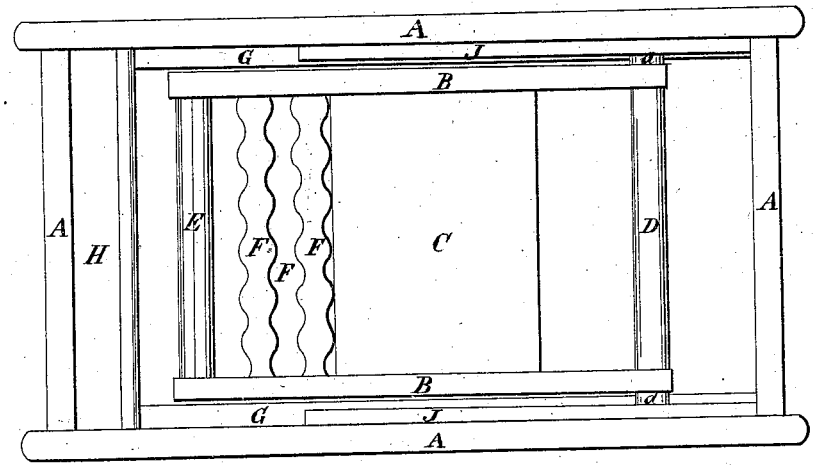
Figure 2:
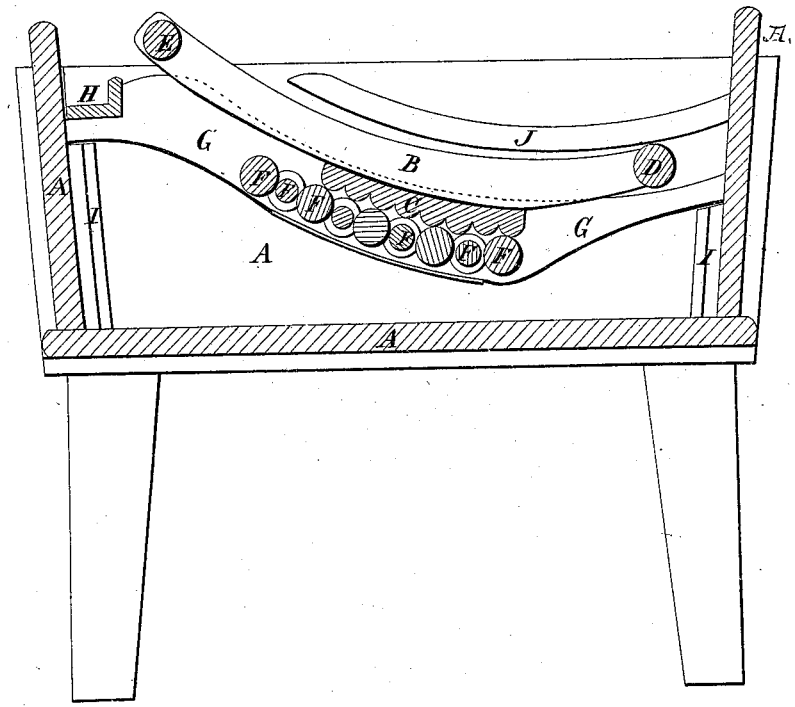
Figure 2:
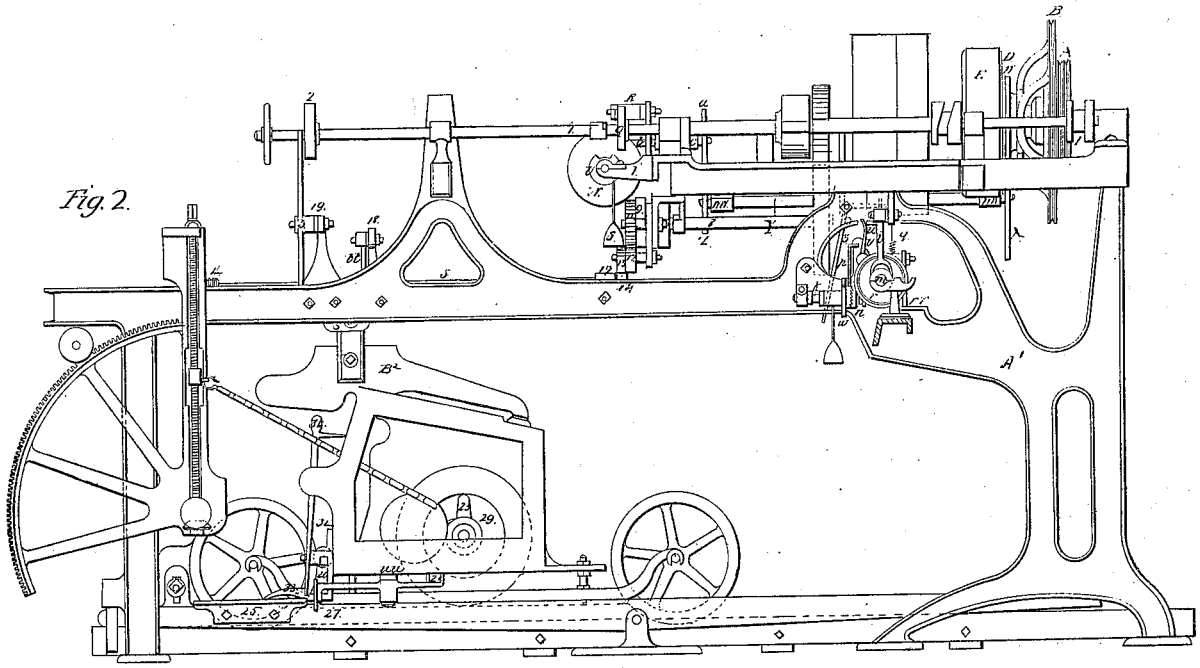
Figure 1:
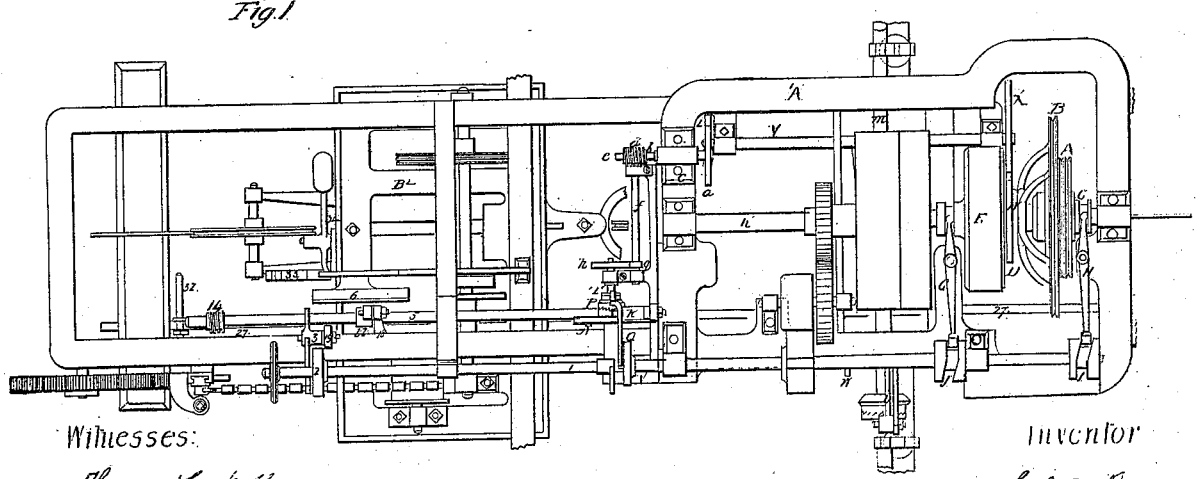

A. B. Parsons,
Washing Machine,
No. 53,035. Patented Mar. 6, 1866.

Witnesses:

Inventor:
A. B. Parsons
by Coburn & Mann
Attorneys

S. D. Paul.
Spinning Mule.

N° 53,036.  Patented Mar. 6, 1866.

Witnesses:  Inventor
Thomas Haskell  Seth D. Paul
Jno. 6 Wing